No. 671,049. Patented Apr. 2, 1901.
J. H. GRAHAM.
BICYCLE STEERING DEVICE.
(Application filed Feb. 16, 1900.)
(No Model.)
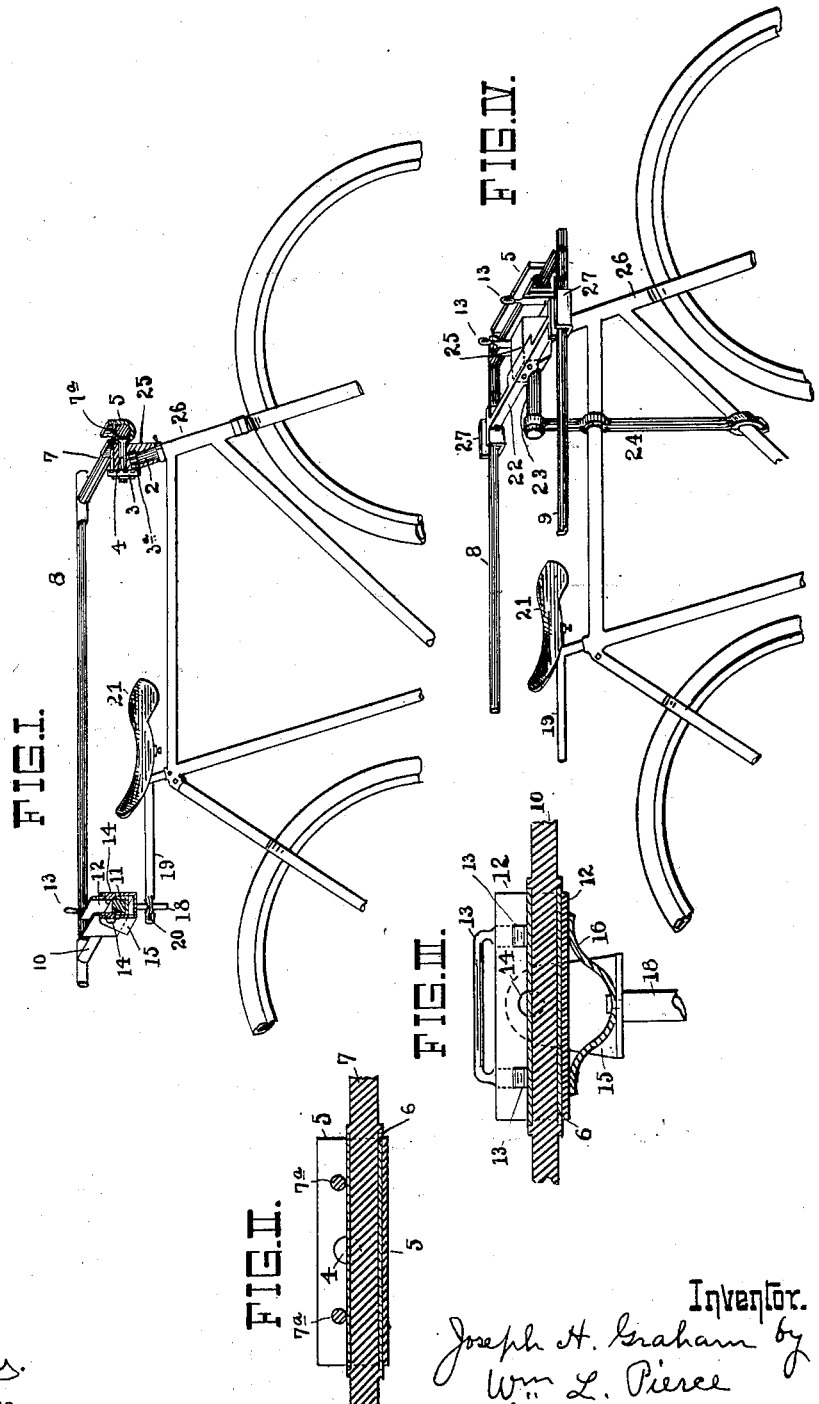
Witnesses:
Geo. H. Harvey.
M. W. Caskey.
Inventor.
Joseph H. Graham by
Wm L. Pierce
his Attorney

UNITED STATES PATENT OFFICE.

JOSEPH H. GRAHAM, OF ALLEGHENY, PENNSYLVANIA.

BICYCLE STEERING DEVICE.

SPECIFICATION forming part of Letters Patent No. 671,049, dated April 2, 1901.

Application filed February 16, 1900. Serial No. 5,423. (No model.)

*To all whom it may concern:*

Be it known that I, JOSEPH H. GRAHAM, a citizen of the United States of America, and a resident of Allegheny, county of Allegheny, and State of Pennsylvania, have invented certain new and useful Improvements in Bicycle Steering Devices, of which the following is a specification.

In a previous patent, No. 638,112, issued to me November 28, 1899, for a bicycle I described and illustrated a frame within which the rider sat and which was used as a substitute for the handle-bars ordinarily used for steering a bicycle. In that patent the side bars of the frame were shown as capable of lateral or horizontal movement to permit the rider to mount and dismount. In the present application I show two types of frame, in neither of which are the side bars laterally movable, but have a rocking vertical movement. In one of these types the entire frame can be swung upward, being pivoted at either the forward or rear end, as desired, thus permitting the rider to get on or off the saddle. In the other of the present types no rear cross-bar is employed; but an equivalent therefor is in front of the rider, and the side bars are extended back only to a line substantially even with the rear end of the saddle, so that the rider can mount and dismount without being interfered with by the frame. Both of the present devices secure the same advantages as attained by the bicycle of my first patent—viz., an erect position of the rider, a more powerful action of the legs, and a freer movement of the knees, particularly in turning, than is secured by the use of the handle-bars that move horizontally. My supplemental frame also stiffens the general frame of the bicycle.

In the accompanying drawings, Figure I is a view, partly in section and in perspective, of the steering-frame and my attachments on a bicycle. Fig. II is an enlarged vertical section of the front support of the steering-frame. Fig. III is an enlarged vertical section of the back support of the steering-frame. Fig. IV is a perspective view of a modified form of steering-frame and supports.

2 is the steering-head of a bicycle; 3, segmental gear meshing with gear $3^a$; 4, shaft connecting segmental gear 3 and front support 5.

6 is a loose collar surrounding the front bar 7 of my frame, shown in Fig. II in the support 5 of the steering-frame. Bar 7 is held in position by pins $7^a$ $7^a$. 8 and 9 are side bars, bar 9 not being shown in Fig. I.

10 is the back bar of the frame, of which the square-faced portion 11 is secured in support 12 by means of automatic latches 13. (Shown in Fig. I as separate latches and in Fig. III as connected together.) Support 12 is connected by means of journals 14 to vertical flange-head 15, and spring 16 is connected to flanged head 15 and steadies support 12. Stem 18 is secured in slot through T-head 19 by means of set-screw 20.

The use of the machine is as follows: The rider releases latch 13, allowing the steering-frame 7, 8, 9, and 10 to be raised on the front end 5 as a pivotal point. The rider brings the frame down as he mounts, the automatic latches 13 securing the rear bar 10 of the frame in back support 12. The rider, being mounted and having hold of each side bar 8 and 9, now has full command of his machine. If he wishes to go to the right, by slightly pressing downward on bar 9 he causes front support 5 to communicate the movement to segmental gear 3, which is meshed in bearing $3^a$. The movement of segmental gear 3 partly rotates gear $3^a$, thereby steering the front wheel to the right. The reverse movement of the above would cause the wheel to turn to the left. The position the rider assumes is to sit erect, so that he can get the full benefit of his muscles without injury to his body. The front and back supports 5 and 12 allow the side bars 8 and 9 to be held firmly at the side of the body. The rider can put more pressure on the pedal, as while pedaling the downstroke he can be lifting upward on the handle-bars 8 and 9, thereby bringing into play all his muscles. The spring 16 keeps the steering-frame 7, 8, 9, and 10 from being too sensitive to pressure by the rider while holding the bars 8 and 9 when the machine is in motion.

In Fig. IV the side bars 8 and 9 are intended to reach to a line with the back of the saddle 21. The equivalent of the rear bar 10 is shown in support 22. The support 22 partly surrounds the extension-shaft 23, which is similar to shaft 4 in Fig. I and performs the same functions, with the addition of affording a rocking seat for the support 22 and shaft 23, being in turn supported by means of vertical brace 24. Latches 13 13 are shown on the front support 5. Part of shaft 23, segmental gear 3, gear 3ª, and steering-head 2 are surrounded by frame 25. Frame 25 is secured to the front tube 26 of the bicycle-frame and holds the inclosed steering parts in position.

In the device of Fig. IV the rider is not supposed to raise and lower the handle-bars to mount or dismount, as the rider can enter at and leave from the rear of the frame.

I have only shown and described a few of the many ways of adjustment and location of the minor parts of my device, which are subject to change and modification by those skilled in the art to which this appertains.

The device of Fig. IV could in addition to the present supports have support 12 attached to T-head 19, and steering-frame 7, 8, 9, and 10 (shown in Fig. I) substituted for bars 8, 9, and 10, thereby giving an additional support to the handle-bars.

Having described my invention, I claim—

1. In a bicycle steering device, the combination of a front cross-bar connected to the steering-head, side bars connected to and extending from the ends of said cross-bar rearwardly past the saddle, and a rear cross-bar connecting the rear ends of said side bars, the whole constituting a frame; and means whereby the frame is permitted to rock vertically on an axis substantially parallel to the length of the bicycle.

2. In a bicycle, the combination of a front cross-bar connected to the steering-head; side bars extending rearwardly from said front cross-bar; a rear cross-bar connecting the rear ends of said side bars; and a support for said rear cross-bar which permits vertical rocking movement of said rear cross-bar, said support being detachably connected to the bicycle-frame.

3. In a bicycle, in combination, a steering-head; a front cross-bar extending transversely of the frame of the bicycle at or close to the steering-head and directly engaging the steering-head and adapted by a vertical rocking movement to actuate the same; a front frame member; a bracket or support extending from said front frame member and adapted to support said cross-bar; and side handle-bars having operative connection with said front cross-bar, said handle-bars being arranged lengthwise of the frame of the bicycle and having a vertical rocking movement on an axis substantially parallel to the length of the bicycle.

4. In combination with a bicycle, side handle-bars having a direct connection with the steering-head of the bicycle and adapted to actuate the same, said handle-bars extending rearwardly from the head; a rest-bar pivoted on the frame between the saddle and steering-head and extending transversely of the frame; and a support at each end of said rest-bar for each of said handle-bars, upon which supports the said handle-bars may be given a vertical rocking movement on an axis substantially parallel to the length of the bicycle.

Signed by me at Pittsburg, Pennsylvania, this 9th day of February, A. D. 1900.

JOSEPH H. GRAHAM.

Witnesses:
ALFRED W. BEATTY,
WM. L. PIERCE.